Nov. 29, 1927.

A. C. LINDGREN

SUBSOILER

Filed July 5, 1923

Inventor.
Alexus C. Lindgren,
By W. P. Doolittle
Atty.

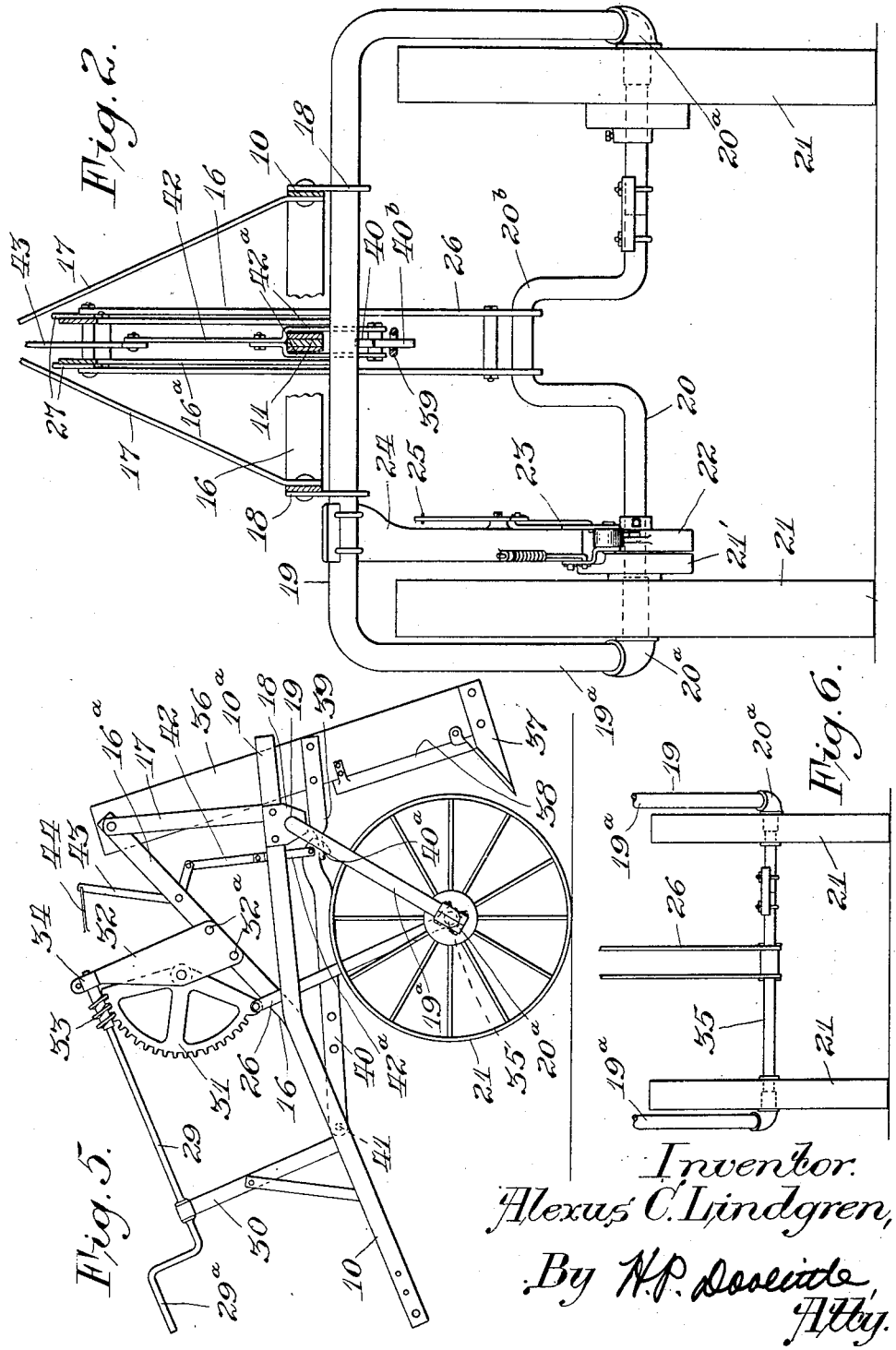

Nov. 29, 1927.  
A. C. LINDGREN  
SUBSOILER  
Filed July 5, 1923  
1,651,031  
3 Sheets-Sheet 3
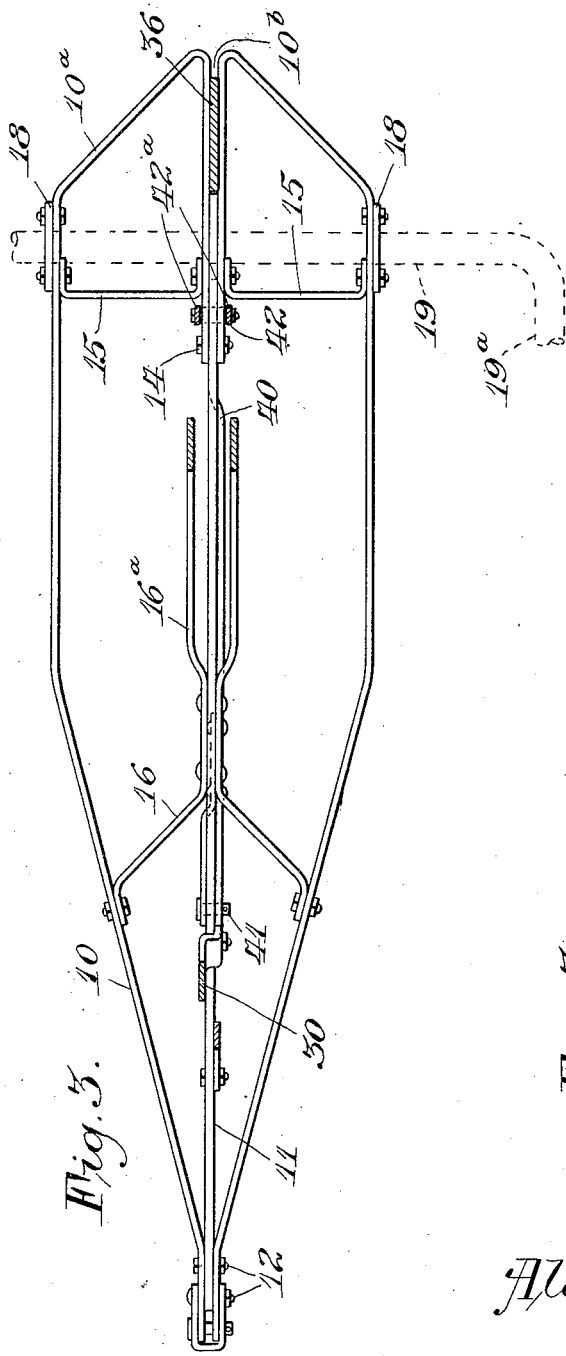
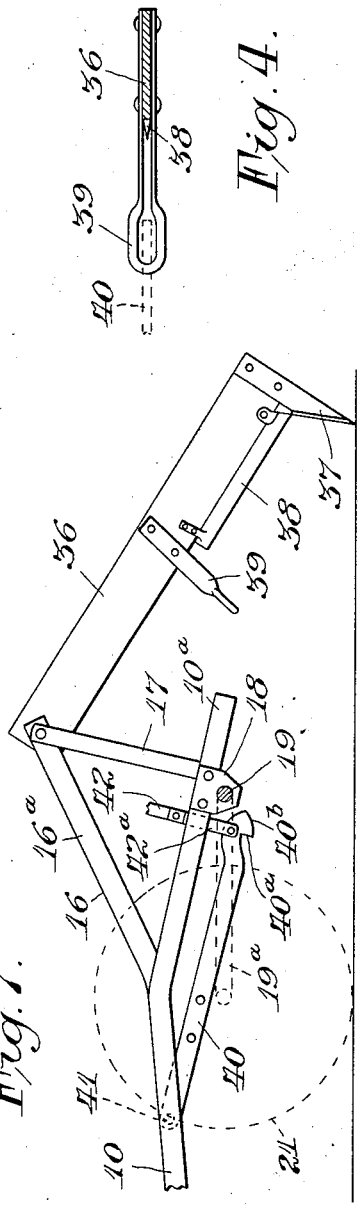
Inventor.
Alexus C. Lindgren,
By H. P. Doolittle
Atty.

Patented Nov. 29, 1927.

1,651,031

UNITED STATES PATENT OFFICE.

ALEXUS C. LINDGREN, OF ST. CHARLES, ILLINOIS, ASSIGNOR TO INTERNATIONAL HARVESTER COMPANY, OF CHICAGO, ILLINOIS, A CORPORATION OF NEW JERSEY.

SUBSOILER.

Application filed July 5, 1923. Serial No. 649,428.

This invention relates to implements for plowing the sub-soil and is directed more particularly to improvement in sub-soil plows designed to be pulled by a tractor.

The principal object of the invention is to provide a sub-soil plow that can be readily controlled by the operator of the tractor pulling the implement without necessitating his leaving his position on the tractor, and with this in view a construction has been provided which embodies a wheel-supported subsoiler standard which can be raised and lowered by mechanism controlled from the tractor and which has means, also controllable from the tractor, for allowing the standard to swing away when any obstacle is met by the sub-soil tool in its course through the soil and means for thereafter returning the tool standard to working position automatically.

Other objects of the invention are to provide a simple and efficient implement of the type stated that will loosen the sub-soil without materially disturbing the surface and which has it parts so constructed and arranged as to transmit the draft power directly to and at a proper point on the tool standard and provide maximum strength and economy of construction.

The invention accordingly resides in the organization and details of construction, or the equivalents thereof, herein more particularly described and claimed.

Referring to the annexed drawings—

Fig. 2 is a view from the rear of the line 2—2 of Fig. 1;

Fig. 3 is a detail plan view of the frame of the implement;

Fig. 4 is a detail sectional view of a part of the latching mechanism;

Fig. 5 is a side elevation of the implement, similar to Fig. 1, but on a reduced scale and showing the tool standard and frame in raised position and also a modified form of lifting mechanism;

Fig. 6 is a detail view showing the lifting connection of the modified form; and Fig. 7 is a partial side view showing the position of the tool standard after same has been released and the frame has traveled forwardly.

Figure 1:
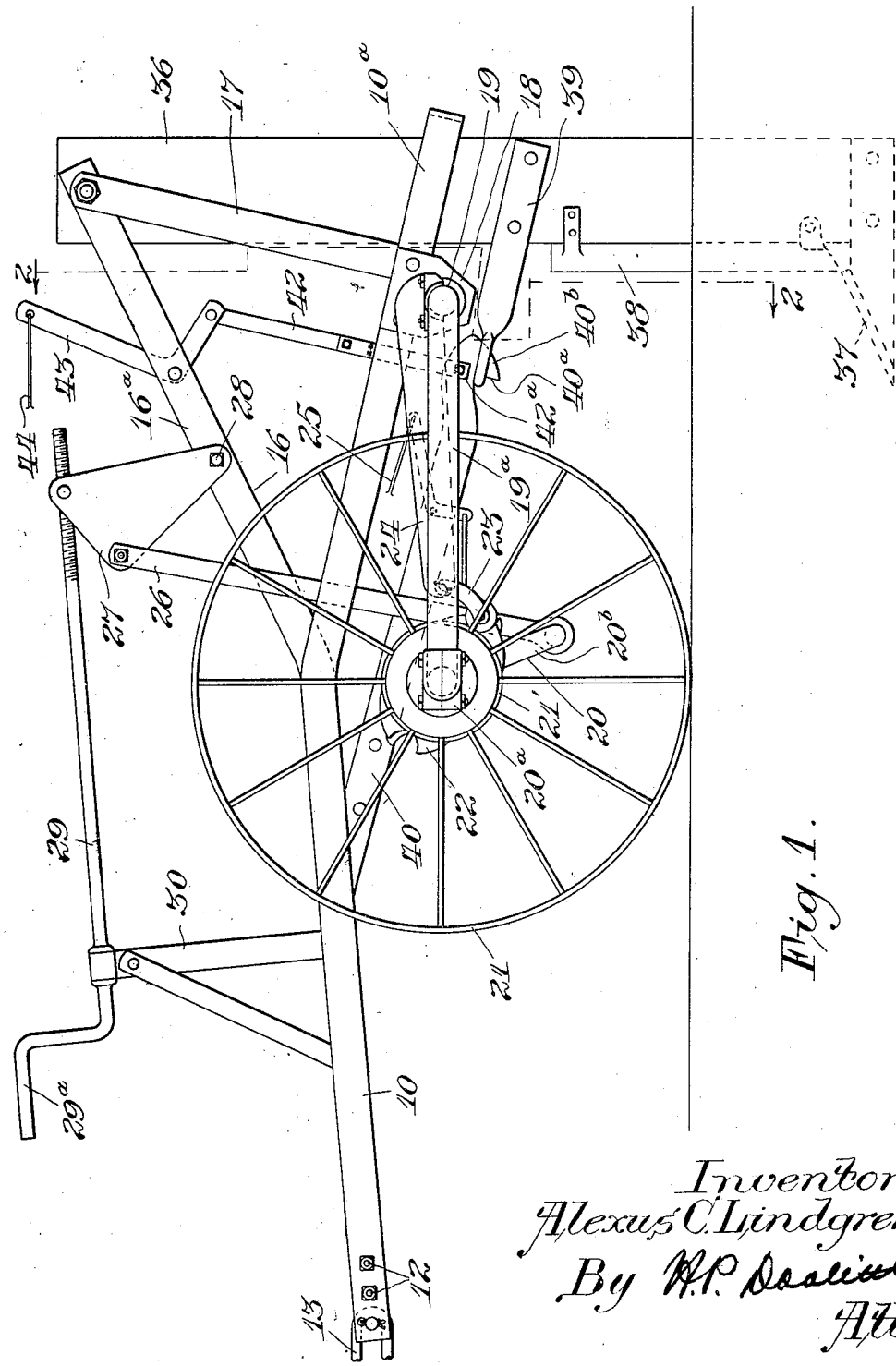
Fig. 1 is a side elevation of a sub-soil plow constructed according to my invention.

In the present instance, the construction embodying the invention consists of longitudinally extending frame members 10 which converge forwardly and are connected at their front ends to each other and to a central longitudinally extending frame bar 11 as by transverse bolts 12. Suitable means, such as a clevis 13, is provided on the forward ends of these bars for connection to the draw-bar of a tractor. These frame members are slightly bowed upwardly at the middle and at their rear ends the frame members or bars 10 converge inwardly as at 10$^a$, Fig. 3, and are then bent forwardly in spaced relation as at 10$^b$ until they engage the rear end of bar 11 to the opposite sides of which they are secured as by bolt 14. Transverse braces 15 are provided on each side of the frame between the outer portions of the frame members 10 and the forwardly projecting portions thereof, as best shown in Fig. 3. The frame is further strengthened by intermediate frame bars 16 which extend inwardly on each side from the forward portions of the frame bars 10 to the central bar 11 to which they are rigidly secured and from which they then diverge slightly and then extend upwardly and rearwardly as at 16$^a$, Fig. 3, to a point substantially directly above the space 10$^b$ between the rear inturned ends 10$^a$ of the main frame bars. At their ends, these bars 16$^a$ are supported and braced by bars 17 extending upwardly from the side bars 10. Near their rear portions the side bars 10 have secured thereto on each side a journal bracket 18 in which there is mounted the horizontal portion of a double crank axle 19, the cranks 19$^a$ of which are directed forwardly and connected at their ends by a transverse shaft 20 on which the supporting wheels 21 are journaled. Shaft 20 has its ends journaled in brackets 20$^a$ on the ends of cranks 19$^a$ and in connection with this shaft and wheels there is provided mechanism for swinging the axle to raise and lower the frame. In Figs. 1 and 2 a power lift device is shown for this purpose which comprises an intermittent clutch mechanism of a type well known in connection with with power lift implements and consisting essentially of a clutch member 21' rotating with the supporting wheel and an intermittently actuated clutch member 22 fixed on the transverse axle 20 and adapted to be locked to rotate with member 21' for a half revolution upon operation of spring pressed trip mechanism 23 which is carried on a bracket 24 secured to the axle and controlled by means of a cord or rod 25 extending forwardly to the tractor. The transverse shaft 20 is formed with a central crank 20$^b$ to which is pivoted a centrally positioned lifting link 26, preferably formed of parallel bars, as shown in Fig. 2, which straddle the central bars 16$^a$ and are pivotally connected at their upper ends to a depth adjusting lever 27 comprising a pair of spaced plates which are pivoted at 28 on the bars 16$^a$. In the present instance, the lever 27 is in the form of triangular plates having one angle pivoted on the frame, a second angle pivoted to the lifting link 26 and the third angle connected to a forwardly extending rod 29 provided with a crank 29$^a$ at its forward end and screw-threaded at its rear end for engagement in a threaded collar which is pivotally mounted between the plates at that point. Near its forward end rod 29 is journaled in a supporting-standard 30 secured on the central frame bar 11. With the lift mechanism just described, it will be seen that turning of crank 29$^a$ will cause lever 27 to be moved on its pivot in one direction or the other, thereby moving the lifting link 26 either upwardly or downwardly and correspondingly adjusting the supporting wheels to regulate the depth of plowing. To entirely lower or raise the frame and tool standard, the clutch mechanism is thrown into operation by a pull on cord 25, thereby causing a half revolution to be given shaft 20 and shifting the crank portion 20$^b$ thereof from its upper to its lower position or vice versa, illustrated in Figs. 1 and 2, this causing the axle cranks and wheels to be shifted in a manner to either raise or lower the frame. As an alternative to use of the power lift mechanism just described, a hand lift mechanism, as illustrated in Fig. 5, may be used. This preferably consists of the arcuate rack 31 pivoted between plates 32 which are fixed on the frame bars 16 at 32$^a$. At the lower end of rack 31 the lifting link 26 is pivoted. Rack 31 cooperates with a worm pinion 33 fixed on the rod 29, which in this modification, has its rear end journaled in a bearing 34 formed on plates 32. In this instance the lifting link 26 is connected to a shaft 35, Fig. 6, the equivalent of the shaft 20 heretofore described, but which is formed without the central crank shown in Fig. 2, the clutch mechanism, etc. also being omitted. With this construction, it will be evident that rotation of rod 29 will swing the arcuate rack 31 on its pivot and will effect either raising or lowering of the frame in much the same manner, but not as quickly, as with the power lift clutch mechanism which is, therefore, preferred.

Between the rear ends of the members 16$^a$ there is pivotally supported to swing rearwardly a tool carrying standard 36 which is preferably formed of a metal plate wide longitudinally and sufficiently thin in cross-section to fit in the space or slot 10$^b$ between the inwardly turned ends 10$^a$ of the frame bars 10 by which it is braced against lateral movement. At its lower end, the tool standard 36 has secured thereto a forwardly extending sub-soil point or share 37 and on its forward edge above this sub-soil point there is provided a knife edge or colter blade 38 which may be detachably secured to the standard 36. Intermediate its ends, the standard 36 has secured thereto at a point below the frame a forwardly projecting loop or eye 39 which forms a coupling member cooperating with a combined draft and latch bar 40 positioned centrally of the frame and pivoted at its forward end as at 41 on the central frame bar 11. The interlocking or latch portion of draft bar 40 consists of a hook or bill 40$^a$ designed to interlock with the eye 39 and formed with a beveled or sloping head 40$^b$ designed to engage with and ride over the eye 39 when engaged thereby. The bar 40 is supported in proper position by a vertical bar 42 that has a forked lower end 42$^a$, the arms of which straddle and rest on the central frame member and are pivoted to the draft bar 40, as best seen in Fig. 2. At its upper end, bar 42 is pivoted to one arm of a bell-crank lever 43 pivoted on the frame, to the other arm of which there is attached an operating cord 44 extending within reach of the operator on the tractor. It will be evident that a pull on this cord will serve to lift the draft bar 40, thereby releasing the latch and leaving standard 36 free to swing rearwardly on the pivot supporting its upper end. The relation of the draft bar 40 to the standard and frame is such that the pull is applied directly to and low down on the standard 36.

The implement construction as above described operates in the following manner. When the frame is lifted for transport, as in Fig. 5, it tilts towards the front and the standard 36 will tend to swing into substantially upright position and be locked in the slot 10$^a$ by the latch mechanism described above. When it is desired to lower the tool to working position, the lift mechanism is operated to shift the axle cranks and the frame and beam thereupon assume the positions shown in Fig. 1 with the sub-soil tool buried beneath the surface. If, during progress of the implement, an obstacle, such as a stone, is encountered by the tool and the implement becomes stalled, the standard is released by a pull on cord 44 and forward travel of the implement is resumed, whereupon standard 36 will swing rearwardly on its pivot until the tool is practically out of the ground, as shown in Fig. 7. At this time, or at any time after releasing the standard, the lift mechanism is operated to swing the axle cranks downwardly to raise the frame and tool standard and as the tool standard swings clear of the ground when the frame is raised, beam 36 will swing forwardly on its pivot and as it enters the space between the ends 10ª of the frame bars the eye 39 will engage the shoulder 40ᵇ which will ride over the eye until the hook 40ª drops into interlocking position therein and again locks the standard in upright position. If the frame is then again lowered, the tool re-enters the ground and operation is resumed.

The provision of means for releasing the tractor pulled upright tool standard when necessity arises, in connection with means for raising the frame and automatically returning the standard to normal position forms the gist of my invention, resulting in a tractor subsoiler of novel form that is correct in construction, easily controlled and capable of meeting all requirements of efficient operation.

The construction above described exemplifies the preferred form of my invention but modifications thereof can obviously be made within the scope of the following claims.

I claim as my invention:

1. A sub-soil plow comprising a wheeled frame, a normally upright subsoiler standard pivotally connected at its upper end with the frame so as to be swingable in the line of travel of the plow, a latch device mounted on the frame in a position below the point of pivotal support of said standard for detachably maintaining the standard in its normal upright position, said latch device also constituting a means for applying draft to the standard, means for raising and lowering the frame, and manually operable means for releasing the latch when the frame is in lowered position to thereby allow the standard to swing rearwardly as the plow advances and to return to normal position by gravity when the frame is thereafter raised.

2. A sub-soil plow comprising a wheel supported frame, a tool carrying standard pivotally associated at its upper end with said frame, means mounted on the frame for normally locking the standard in upright position, said frame having parts spaced so as to provide a longitudinally extending slot engaging the sides of the standard, said frame parts slidably engaging the standard intermediate the locking means and the pivot of the standard, means for raising and lowering the frame, manually operable devices for releasing the locking means, and means for effecting remote control of said means, both said locking means being so constructed and arranged with reference to the point of pivotal support of the standard that the standard is automatically re-locked to the frame when the plow advances with the frame in raised position subsequent to a release of the locking means.

3. A sub-soil plow comprising a frame, a U-shaped crank axle having its bight portion journaled in the frame, supporting wheels at the ends of the crank axle, a shaft supported by said wheels and extending between the cranks of said axle and the wheels, an upright subsoiler standard having its upper end pivoted to the frame so as to swing rearwardly, a latch device on the frame for engaging the standard below its pivot for locking the standard in upright position, means connecting the frame with said shaft for swinging the axle cranks to raise and lower the frame, manually operable and remotely controlled means for releasing said latch to permit the standard to swing rearwardly as the plow travels forwardly, and means including the latch device for automatically re-locking the standard in upright position as it swings forward by gravity when the frame in raised.

4. A sub-soil plow comprising a wheel supported frame, an upright subsoiler standard pivoted at its upper end to the frame so as to swing rearwardly therefrom, said frame including parts laterally spaced to form a slot for slidably receiving an intermediate part of the standard when the latter is in an upright position, and a draft coupling on the frame including a releasable latch connected to the standard intermediate its ends for normally retaining the standard in said slot.

5. In a sub-soil plow the combination of a vertically movable frame, means for raising and lowering the frame, a normally upright subsoiler standard pivoted at its upper end on the frame to swing in the line of travel, said standard having an intermediate portion slidably interfitted between portions of the frame, releasable means for locking the standard in normal position, said standard swinging rearwardly out of the soil under the influence of forward travel when released, and gravity actuated means effecting automatic relocking of the standard in normal position as the frame is raised.

6. In a tractor sub-soil plow, the combination of a frame adapted to be hitched to a fixed point on a tractor, means for lifting and lowering the frame on said hitch point, a normally vertical standard pivoted at its upper end to the frame and having its lower end positioned to engage in the soil when the frame is down and be free thereof when the frame is up, a draft connection including automatic coupling means connecting the lower portion of the standard to the frame, means for releasing the coupling upon meeting obstructions thereby causing the standard to swing rearwardly through continued forward travel of the frame, said means for lifting the frame on its hitch point constituting means for returning the standard to coupled relation with the draft connection by causing forward swing of the standard by gravity to normal position when raised free of the soil.

7. In a tractor sub-soil plow, the combination of a frame having a rear elevated portion and adapted at its lower forward portion to be hitched to a fixed point on a tractor, means for lifting and lowering the frame on said hitch point, a normally vertical standard pivoted at its upper end to the elevated portion of said frame and having its lower end positioned to engage the soil when the frame is down and be free thereof when the frame is up, means on the frame for bracing the standard against lateral movement, a draft connection including automatic coupling means connecting the lower portion of the standard with the forward portion of the frame, means for releasing the coupling upon meeting obstruction thereby causing the standard to swing rearwardly through continued forward travel of the frame, said means for lifting the frame on its hitch point constituting means for returning the standard to coupled relation with the draft connection by causing forward swing of the standard by gravity to normal position when raised free of the soil.

In testimony whereof I affix my signature.

ALEXUS C. LINDGREN.